US009232773B2

(12) United States Patent
Lockie (10) Patent No.: US 9,232,773 B2
(45) Date of Patent: Jan. 12, 2016

(54) DESTACKING AND RESTACKING OF CONTAINERS USING A ROBOT IN POULTRY HATCHERY OPERATIONS

(75) Inventor: David James Lockie, Ilderton (CA)

(73) Assignee: KL PRODUCTS INC., London, Ontario ( * ) Notice: Subject to any disclaimer, the term of this patent is extended or adjusted under 35 U.S.C. 154(b) by 557 days.

(21) Appl. No.: 12/864,264

(22) PCT Filed: Jan. 23, 2009

(86) PCT No.: PCT/CA2009/000078
§ 371 (c)(1),
(2), (4) Date: Oct. 13, 2010

(87) PCT Pub. No.: WO2009/092166
PCT Pub. Date: Jul. 30, 2009

(65) Prior Publication Data
US 2011/0206494 A1 Aug. 25, 2011

Related U.S. Application Data

(60) Provisional application No. 61/006,611, filed on Jan. 23, 2008.

(51) Int. Cl.
| | |
|---|---|
| *B65B 23/02* | (2006.01) |
| *A01K 41/06* | (2006.01) |
| *A01K 45/00* | (2006.01) |
| *B65G 47/90* | (2006.01) |

(52) U.S. Cl.
CPC ............... *A01K 41/065* (2013.01); *A01K 45/00* (2013.01); *B65G 47/90* (2013.01)

(58) Field of Classification Search
USPC ............ 294/188, 65, 87.12; 414/265, 331.04, 414/401, 411, 416.07, 788.2, 788.3, 788.7, 414/788.8, 792.7, 792.8, 792.9, 793, 793.1, 414/793.2, 794.9, 795, 795.3, 795.6, 795.8, 414/796.5, 796.9, 797, 797.1, 797.4, 797.7, 414/798.4, 799, 801, 802, 924, 927
See application file for complete search history.

(56) References Cited

U.S. PATENT DOCUMENTS

| | | | |
|---|---|---|---|
| 3,506,140 A | | 4/1970 | Koch et al. |
| 3,559,371 A | * | 2/1971 | Borrowman .................... 53/390 |
| 3,606,960 A | * | 9/1971 | Butterworth .................. 221/211 |
| 3,696,966 A | | 10/1972 | Herolzer |

(Continued)

FOREIGN PATENT DOCUMENTS

| | | |
|---|---|---|
| CA | 1038321 C | 9/1978 |
| CA | 1311660 C | 12/1992 |
| EP | 326422 A2 | 8/1989 |

OTHER PUBLICATIONS

PCT International Search Report and Written Opinion, International Filing Date Jan. 23, 2009; International Application No. PCT/CA2009/000078.

*Primary Examiner* — Gregory Adams
(74) *Attorney, Agent, or Firm* — Barbara L. Renda; Scott C. Mayhew (57) ABSTRACT

A method of destacking or restacking standardized containers used in poultry hatchery operations using robotic means involves the step of moving a container from a conveyor onto a box transport dolly or vice versa. The box transport dolly is dimensionally secured within a dolly docking station adjacent a robot. A quantity of eggs may be transferred into the destacked container.

12 Claims, 6 Drawing Sheets

(56) References Cited

U.S. PATENT DOCUMENTS

| | | | |
|---|---|---|---|
| 3,763,625 A | 10/1973 | Slavin et al. | |
| 3,891,097 A | 6/1975 | Shackelford et al. | |
| 4,045,073 A * | 8/1977 | Mosterd | 294/87.12 |
| 4,135,630 A * | 1/1979 | Snyder et al. | 414/627 |
| 4,293,272 A * | 10/1981 | Jellema | 414/744.5 |
| 4,355,936 A | 10/1982 | Thomas et al. | |
| 4,355,939 A | 10/1982 | Musgrave | |
| 4,398,499 A | 8/1983 | Blakely | |
| 4,568,231 A * | 2/1986 | Czajka et al. | 414/788.4 |
| 4,778,329 A * | 10/1988 | Phillips | 414/589 |
| 4,894,598 A * | 1/1990 | Daggett | 318/568.16 |
| 5,007,785 A * | 4/1991 | van der Schoot | 414/331.11 |
| 5,020,001 A * | 5/1991 | Yamamoto et al. | 700/247 |
| 5,146,871 A | 9/1992 | Havran | |
| 5,169,283 A * | 12/1992 | Covert | 414/793.7 |
| 6,234,745 B1 * | 5/2001 | Pugh et al. | 414/796.9 |
| 7,143,567 B2 * | 12/2006 | Omo et al. | 53/443 |
| 2002/0131855 A1 * | 9/2002 | Sonderby Kristensen et al. | 414/795.6 |
| 2005/0053455 A1 * | 3/2005 | Jaspers et al. | 414/795.6 |

* cited by examiner

DESTACKING AND RESTACKING OF CONTAINERS USING A ROBOT IN POULTRY HATCHERY OPERATIONS

CROSS-REFERENCE TO RELATED APPLICATIONS

The present invention claims benefit of priority to U.S. patent application Ser. No. 61/006,611, which was filed on 23 Jan. 2008, and which is incorporated by reference as if fully recited herein.

TECHNICAL FIELD

The present invention relates to the use of a robot to destack and restack containers used in poultry hatchery operations. The robot has specially configured end effectors complementary to the container.

BACKGROUND OF THE INVENTION

The invention relates to improvements in container destacking and restacking operations in poultry hatcheries or the like. The invention is concerned with the handling of standardized containers, such as trays, boxes, baskets and flats used in hatchery operations by robotic means. The robot is equipped with a specially configured end effector to grasp, move, tilt, manipulate and rotate the container as may be required by any particular operation. In the prior art, various destacking and restacking operations involving containers are carried out by special purpose dedicated machines and related equipment which are eliminated by the use of a robot according to this invention.

In general terms, the term destacking refers to the step wherein a container is removed from a like stack of containers and placed on a conveyor or other surface during poultry operations. The term restacking refers to the opposite step wherein a container is removed from a conveyor or other surface and placed on a like container in a stack. In some cases a box transport dolly may be used to hold the stack of containers. In other cases a rack or buggy with shelves could be used. The term poultry hatchery operations refers to the handling and processing of eggs or newly hatched birds such as chickens, turkeys, ducks, geese, pheasant, quail, referred to herein as chicks.

To give several examples of destacking and restacking operations, live chicks are placed into containers called chick boxes which are moved by a conveyor to be vertically stacked and loaded onto a standardized box transport dolly for truck transport to the farm. A Smithway® dolly is one example of a suitable box transport dolly. In these operations, machine and related equipment known as a box turner, box restacker and a dolly loader is installed on the conveyor line to rotate, stack and load chick boxes onto the dolly.

The use of a robot enables the above equipment to be eliminated and all of the operations may be combined and performed by a single robot. The robot picks up the boxes from the end of the conveyor, rotates the box and stacks the box on the dolly all in one continuous motion.

In cases where two conveyor lines are used, the robot may be placed at the end between parallel conveyor lines eliminating the need to converge the conveyors into a single file upstream of the box turner, box restacker and dolly loader machines and related equipment. This simplifies and streamlines the conveyor line resulting in cost savings and minimal footprint for the equipment.

Another example relates to poultry hatchery operations that separate the live chicks from their shells. Hatch trays containing live chicks are delivered on dollies at one end of a conveyor line and are destacked by an destacking machine and placed on the conveyor for the separation step at a downstream location on the conveyor. Once the separation step is complete, the empty tray is conveyed to a washing station and finally conveyed to the end of the conveyor line. At this location, a tray restacker machine loads the empty trays onto dollies.

The use of a robot at each end of the conveyor line to destack and restack the trays eliminates the need for the specialized tray destacker and tray restacker machines and related equipment on the conveyor line. In cases, for example, where two lines are used, the use of a robot eliminates the need for two destackers and two restackers and may also eliminate the need for two dolly conveyors that feed the unloaded dolly to the end of the conveyor to be reused when the trays are restacked thereon.

Yet another example relates to egg transfer operations following, for example, vaccination. Typically the eggs are moved on the conveyor in containers called flats and must be transferred from the flats to trays which are stacked and loaded onto dollies for transport. The prior art egg transfer operations require the use of machines and related equipment known as a tray destacker, egg transfer machine, and tray restacker. All of these operations are simplified by the elimination of the above equipment by the use of a robot that destacks a tray and restacks the tray onto a dolly. In a second sequence the robot transfers the eggs into the tray. The destacking and restacking step is then repeated as required with reference to a restacked container and eggs are again transferred.

Yet another example prior to and post the vaccination process, relates to destacking and restacking flats with reference to a rack or buggy having shelves. In the prior art, destacking and restacking operations involving flat containers are carried out by special purpose dedicated machines and related equipment which are eliminated by the use of a robot according to this invention.

In most operations, the robot must be dimensionally referenced to a flat transport rack or buggy from which the containers are destacked or restacked thereon. Accordingly, a rack docking station is provided at a convenient location adjacent the robot for securing the dolly within. For these purposes, a rack is any wheeled shelved platform specially dimensioned to hold a plurality of flats stacked on shelves such as a Chickmaster Setter Rack. The docking station (not shown) is typically a tall box-like structure with a side opening to permit the entry of a rack. Once the dolly is inside the structure, hydraulic, pneumatic or electromechanical means may be used to clamp and secure the dolly in the dock with reference to a preselected reference point on the dock.

SUMMARY OF THE INVENTION

These and other objects of the invention are met by the embodiments disclosed hereafter describing the use of robotic means to destack or restack standardized containers used in poultry hatchery operations. The robotic means includes an end effector adapted to hold and move the container in three dimensions. In one embodiment of the invention, the method involves the repeating step of moving a container from a first stacked position adjacent a robot to a second destacked position. In some embodiments the container is moved from a box transport dolly to a conveyor or vice versa. In yet other embodiments the container is moved from a rack or buggy with shelves or vice versa. In some embodiments a box transport dolly is dimensionally secured against movement within a dolly docking station adjacent the robot to provide a dimensional reference for the robot.

The invention is useful to destack and restack containers such as boxes, trays or flats.

According to another embodiment, the container is moved from a first stacked position to a second stacked position to operationally permit a quantity of eggs to be transferred into the destacked container. These steps may be repeated and the next container in the stack may be destacked and restacked on the first mentioned container whereupon a quantity of eggs may again be transferred to the restacked container. These steps may be repeated as required.

In another embodiment, a dual purpose end effector is adapted to selectively and sequentially move either containers or eggs. In yet another embodiment, the containers may be destacked onto a box transport dolly which is secured against movement within a dolly docking station located adjacent a robot. In yet another embodiment, the end effector is adapted to transfer the eggs by means of a vacuum operable suction cup array.

BRIEF DESCRIPTION OF THE DRAWINGS

A better understanding of the embodiments will be obtained by reference to the accompanying drawings, wherein identical parts are identified with identical reference numbers, and wherein.

DETAILED DESCRIPTION OF PREFERRED EMBODIMENTS

Figure 1:
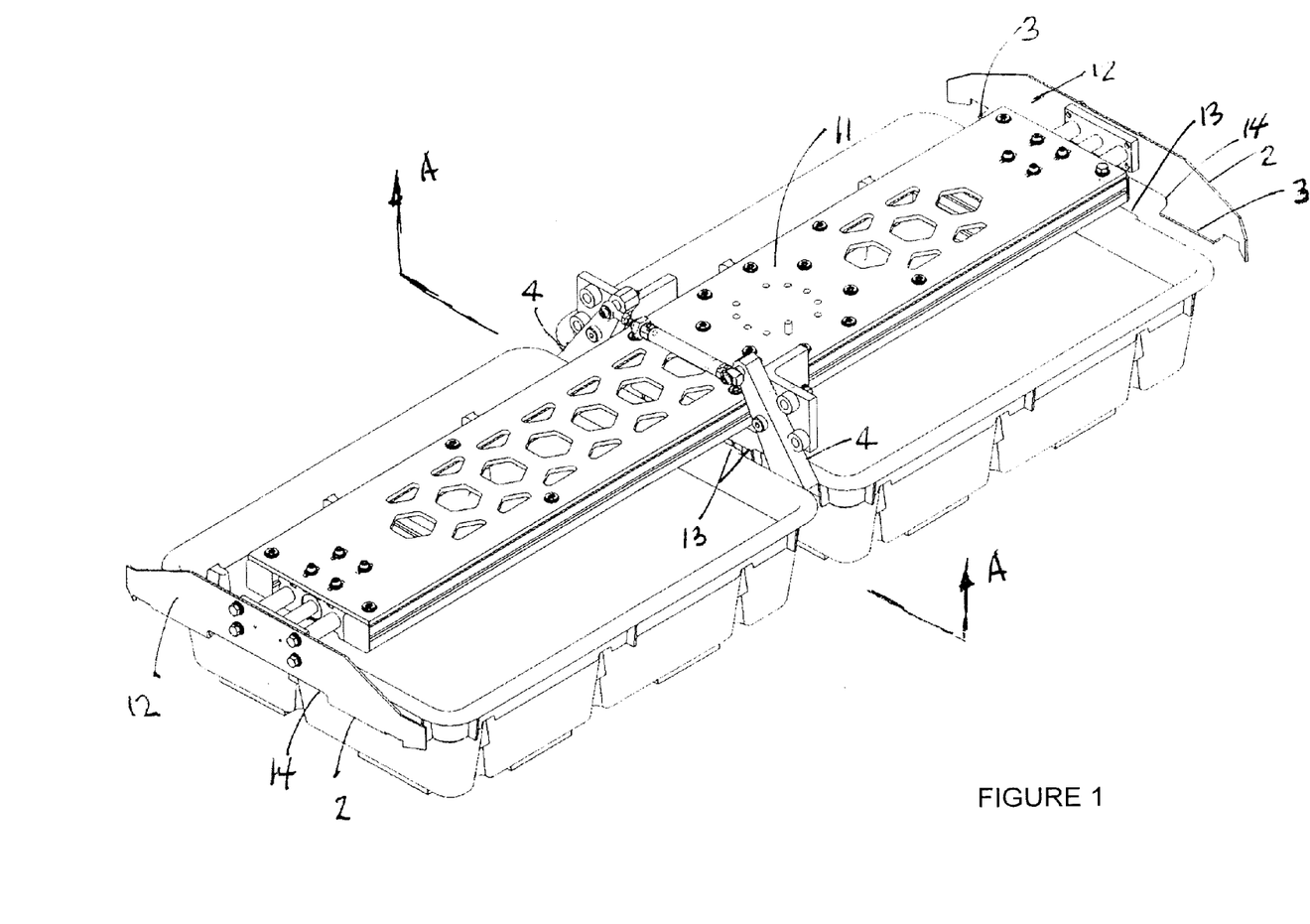
FIG. 1 is an isometric view illustrating an end effector configuration for handling a two box tandem arrangement.

Referring to FIG. 1, the end effector has a back frame 11 for attachment to the robot arm (not shown). The frame is sized appropriately for a particular or desired size and configuration of container. At each end of the frame, container retaining means 12 are provided which are configured to clamp and support the external surface and rim features of the particular container used. FIG. 1 illustrates two containers in a tandem end to end arrangement although other arrangements, including a single container arrangement, may be selected and used depending on the operations.

The retaining means consists of end jaws 2 which are urged inwardly to horizontally clamp the ends of the container and vertically support the outwardly protruding rim of the container by means of a pair of inwardly aligned flanges 3. In operation, the end jaws 2 move inwardly in response to electromechanical, pneumatic or hydraulic means to horizontally clamp the entire tandem arrangement and place the upper surface of the flanges 3 underneath the container rim for vertical support.

Figure 2:
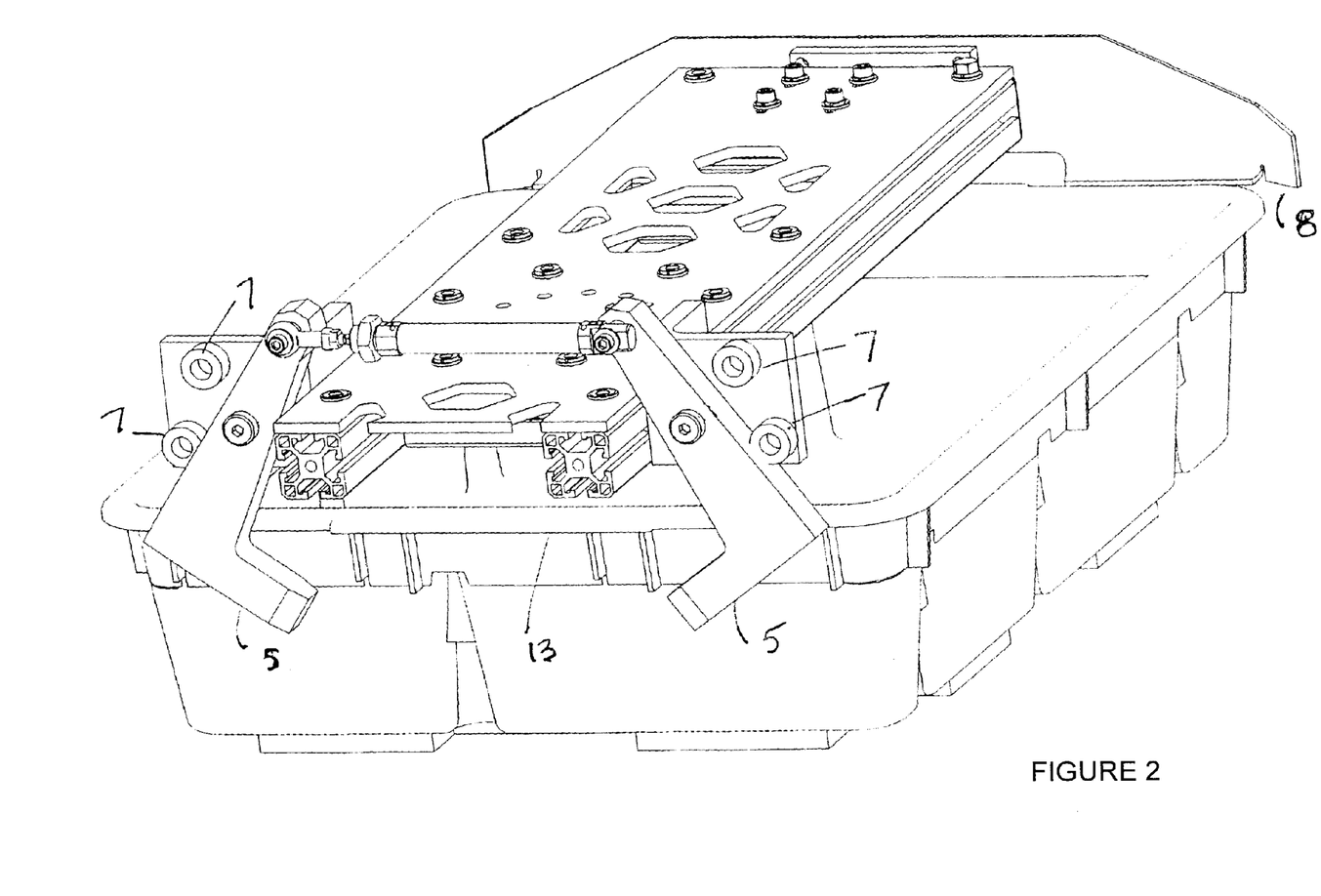
FIG. 2 is a partly sectional isometric view taken at AA in FIG. 1 illustrating the center container retaining jaws in the open position.
Figure 3:
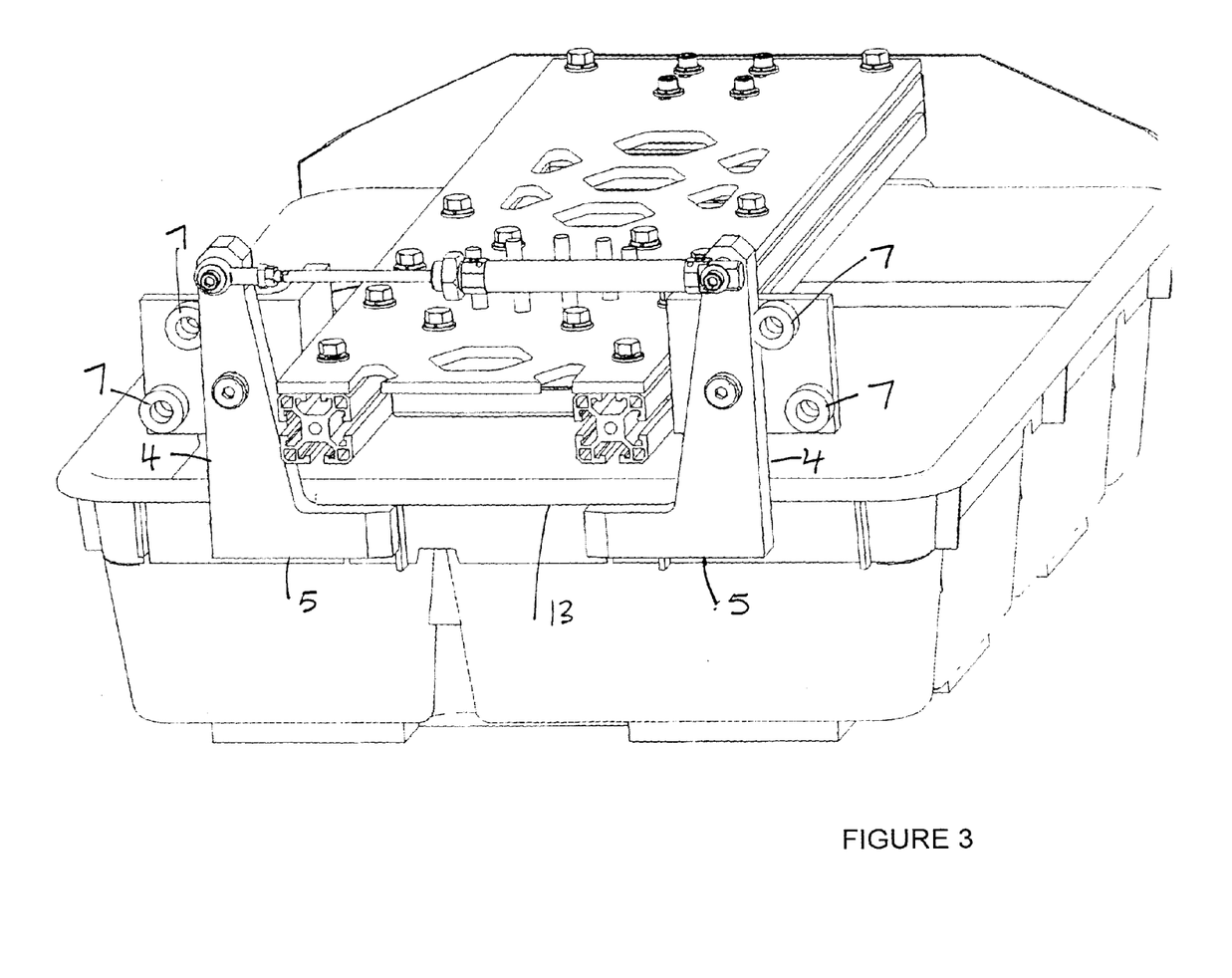
FIG. 3 is a partly sectional isometric view taken at AA in FIG. 1 illustrating the center retaining jaws in the closed position.

The inside handles 13 of the container are supported by a pair of pivoting jaws 4. The pivoting jaws 4 have a thickness which create a space between the adjacent ends of the containers to thereby separate the container ends of the tandem arrangement. The handles 13 are supported underneath by a pair of pivoting jaws 4 having legs 5 that rotate inwardly to engage the underside of the inside handles 13 as shown in FIG. 2. Conventional stops 7 are provided to limit the movement of the arms. In order to align the container more precisely with the references to the back frame of the end effector, corner guides 8 are provided to positively urge and move the container into a centered reference position underneath the frame. Further, the end jaws 2 have shaped recesses 14 complementary to the handle which seat or nest thereon to help align the container with reference thereto.

Figure 4:
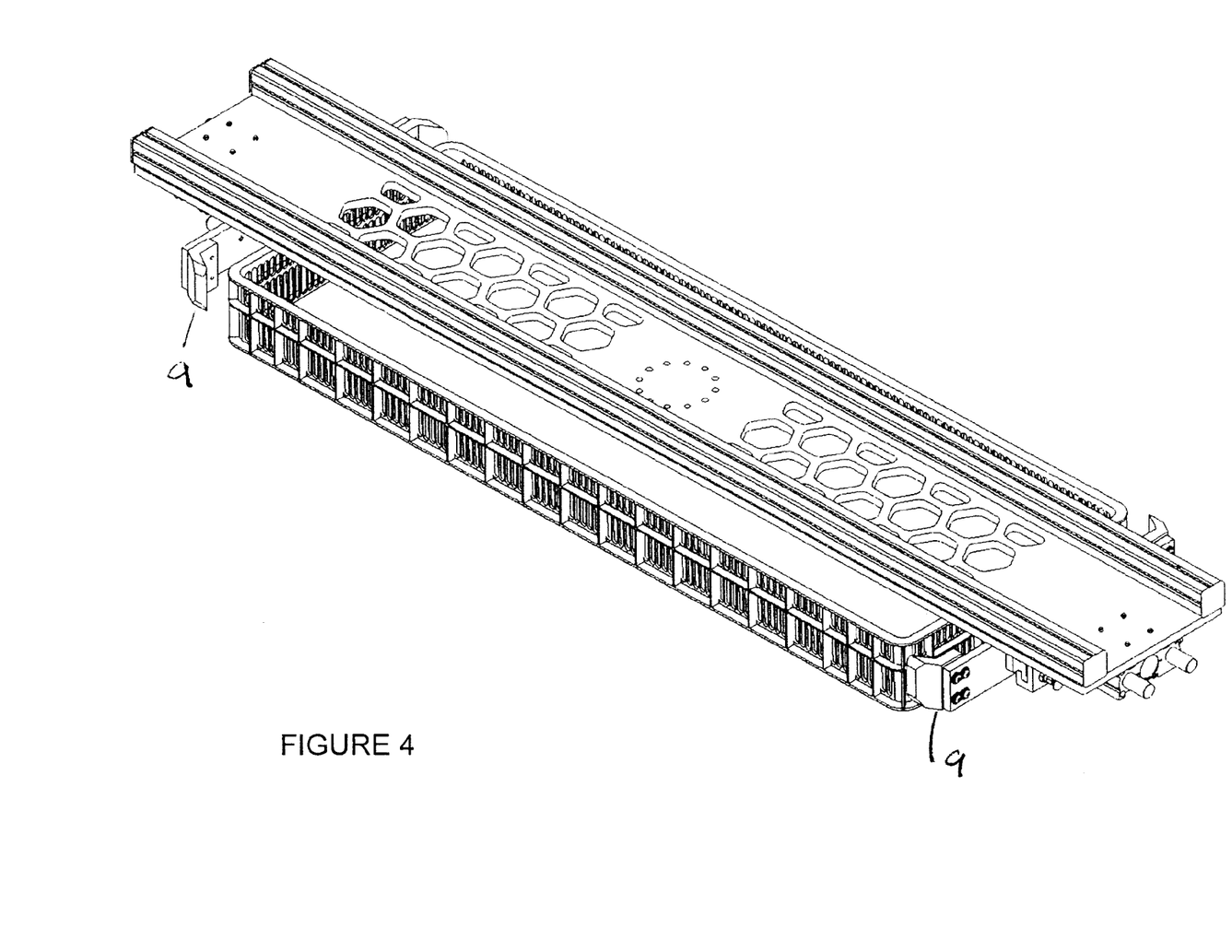
FIG. 4 is an isometric view illustrating a different end effector configuration for handling a tray.
Figure 5:
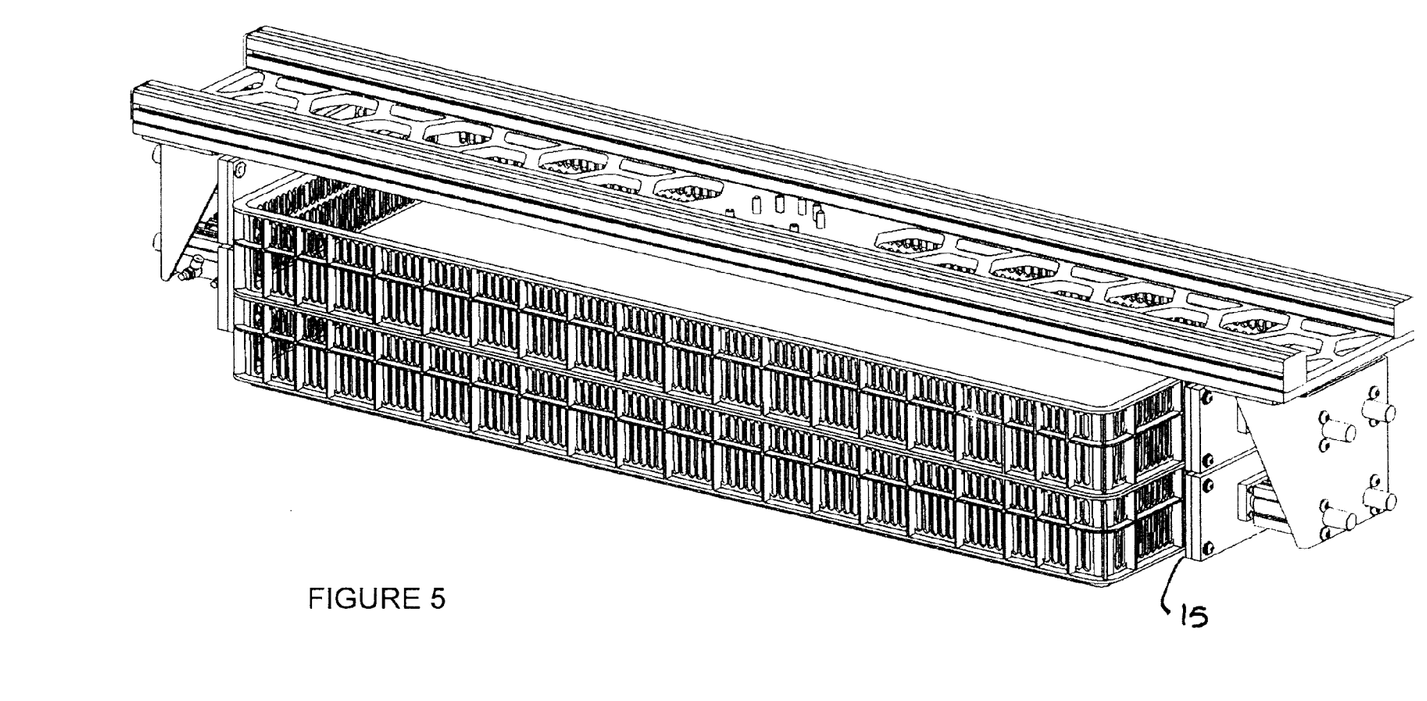
FIG. 5 is an isometric view and illustrates yet another end effector configuration for handling a two stacked tray arrangement.

FIG. 4 illustrates a different configuration for an end effector which operates to clamp the end arms against the end surfaces of the container. Corner guides 9 are provided in cases where alignment of the container with reference to the frame of the end effector is required. In cases where precise alignment is not required in, for example, a destacking operation, clamping faces having a rubberized or other gripping surface 15 without corner guides may be used as shown in FIG. 5. FIG. 5 additionally illustrates an end effector configuration for simultaneously clamping two vertically stacked trays.

Figure 6:
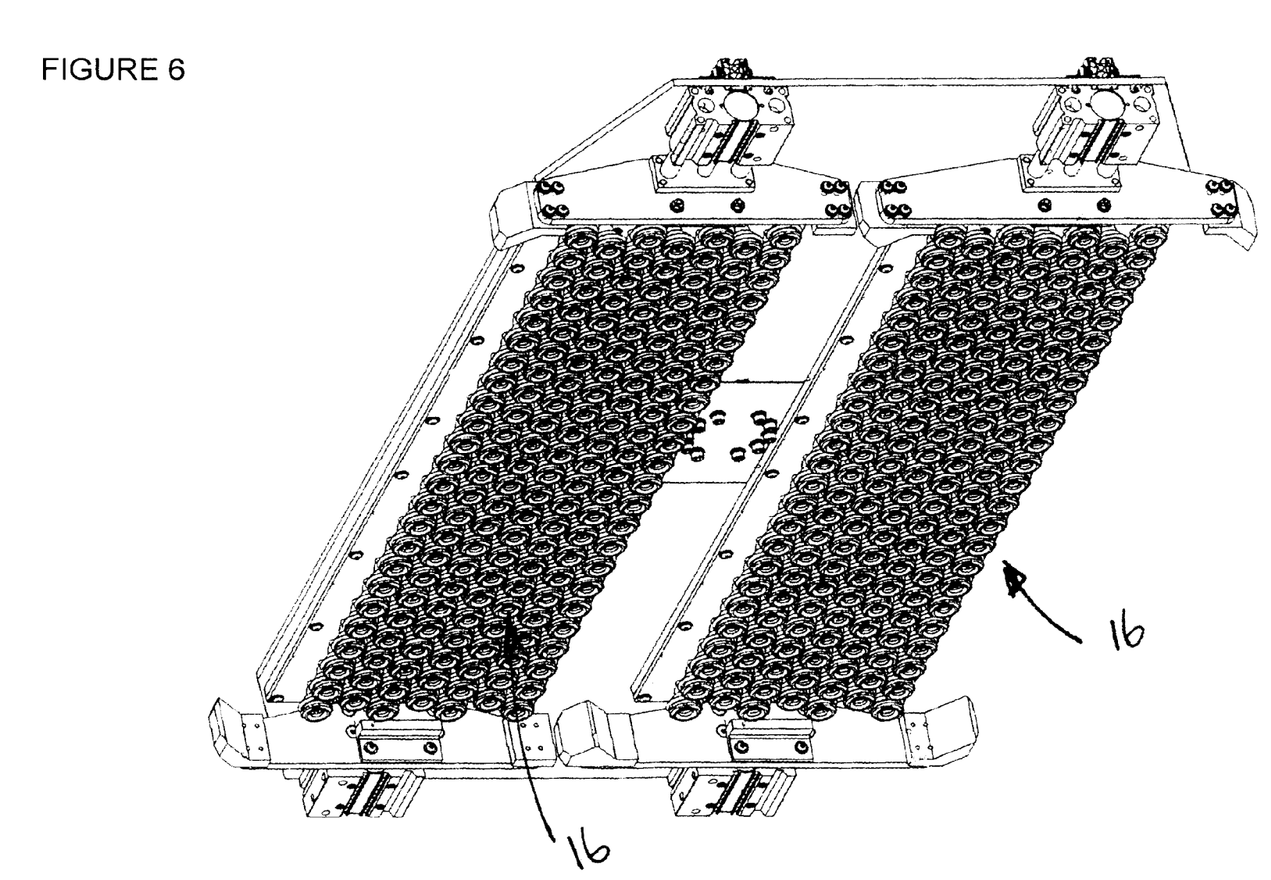
FIG. 6 is an isometric view illustrating the underside of a dual purpose end effector for handling trays and eggs.

Referring to FIG. 6, a dual purpose end effector is shown having container clamping means similar to that shown in FIG. 4. An array of suction cups 16 is additionally provided to transfer the eggs. In operation, this dual purpose end effector is used to destack a tray and place it on a dolly in position to receive the eggs as the first step. The second step involves using the suction cup array feature on the end effector to grasp and take away a quantity of eggs from a standard flat arranged in complementary fashion to the suction cup array. The eggs are transferred into the destacked tray on the dolly. This step is repeated by destacking a second tray and placing it on top of the first mentioned tray for receiving a second batch of eggs and so on.

Referring to FIG. 6, the end effector shown is optionally configured to destack two trays at a time and take away and load two batches of eggs at a time into the destacked trays having regard to the above described single egg transfer operation.

In most operations, the robot must be dimensionally referenced to a box transport dolly from which the containers are destacked or restacked thereon. Accordingly, a dolly docking station is provided at a convenient location adjacent the robot for securing the dolly within. For these purposes, a dolly is any wheeled platform specially dimensioned to hold a plurality of stacked or stackable containers such as a Smithway dolly. The docking station (not shown) is typically a low box-like structure with a side opening to permit the entry of a dolly. Once the dolly is inside the structure, hydraulic, pneumatic or electromechanical means may be used to clamp and secure the dolly in the dock with reference to a preselected reference point on the dock.

The use of conveyors to destack and restack containers in hatchery operations advantageously serves to increase the speed and accuracy of these operations resulting in reduced capital and operating costs and increased production rates. The use of a robot adds flexibility by enabling the installed robotic equipment to handle containers of different sizes and configurations thus creating opportunity for integration with existing equipment. As well, less floor space or equipment footprint is required enabling reduced construction costs and permitting retrofitting in existing facilities. Finally, the robot eliminates a multiplicity of prior art equipment thereby resulting in savings of cost, maintenance and increasing reliability.

The robot used for these destacking and restacking operations is a multi-axis robot such as, for example, FANUC® M710iC-50/70, or other series-link, five or six-axis robot arm that is servo-driven on all axis, equipped with a specialized end effector to grasp, grip, tilt, rotate or otherwise manipulate the container as may be required by a particular operation requiring the destacking and restacking of containers on the conveyor line. As is well known, the end effector may operate hydraulically, electromechanically or pneumatically.

Further advantages which are inherent to the invention are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

What is claimed is:

1. A method of destacking or restacking at least one standardized container used in poultry hatchery operations using robotic means, comprising the steps of:
   providing a multi-axis robot arm, wherein said multi-axis robot arm is a series-link, five or six-axis robot arm that is servo-driven on all axis;
   providing an end effector adapted to hold and move a container in three dimensions, said end effector having a frame and container retaining structures which are configured to clamp and support an external surface of the container, wherein said end effector is attached to said multi-axis robot arm;
   removing eggs from an egg flat with the end effector;
   clamping and supporting the external surface of the container;
   moving the container from a first stacked position to a second destacked position;
   transferring the eggs into the destacked container using the end effector.

2. The method as claimed in claim 1, wherein said first position is a box transport dolly and wherein said second position is a conveyor.

3. The method as claimed in claim 2, wherein said box transport dolly is dimensionally secured against movement within a dolly docking station adjacent the robot.

4. The method as claimed in claim 3, wherein said standardized container is a box, tray or flat.

5. The method as claimed in claim 4, wherein said box transport dolly includes a rack.

6. The method as claimed in claim 4, wherein said box transport dolly is a buggy having shelves.

7. The method as claimed in claim 1, comprising the additional repeating steps of
   (i) destacking a next container and restacking said next container on the first mentioned destacked container;
   (ii) removing eggs from a next egg flat with the end effector;
   (iii) transferring the eggs into said next restacked container.

8. The method as claimed in claim 7, wherein the egg transfer step is performed by robotic means having said end effector adapted to selectively hold and release a quantity of eggs.

9. The method as claimed in claim 8, wherein the second stacked position is a box transport dolly.

10. The method as claimed in claim 9, wherein said box transport dolly is dimensionally secured against movement within a dolly docking station adjacent to the robot.

11. The method as claimed in claim 10, wherein said end effector is dual purposely adapted to selectively and alternatively destack and restack a container and transfer the eggs.

12. The method as claimed in claim 11, wherein the end effector is adapted to transfer the eggs by means of a vacuum operable suction cup array.

* * * * *